No. 787,055. PATENTED APR. 11, 1905.
F. SCHREIDT.
FISHING POLE AND REEL.
APPLICATION FILED OCT. 2, 1903.

2 SHEETS—SHEET 1.

Witnesses.
C. W. Miles
A. McCormack

Inventor
Frank Schreidt
By Murray & Murray
Attorneys.

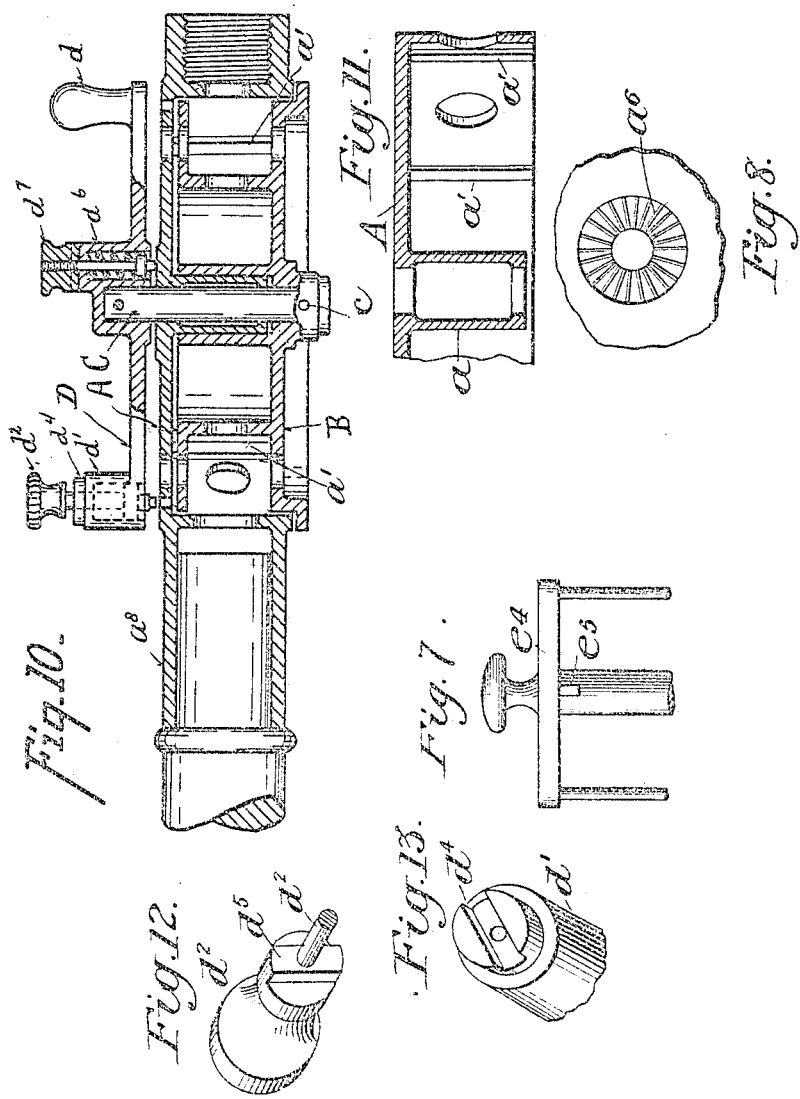

No. 787,055.

Patented April 11, 1905.

UNITED STATES PATENT OFFICE.

FRANK SCHREIDT, OF MANSFIELD, OHIO.

FISHING-POLE AND REEL.

SPECIFICATION forming part of Letters Patent No. 787,055, dated April 11, 1905.

Application filed October 2, 1903. Serial No. 175,464.

*To all whom it may concern:*

Be it known that I, FRANK SCHREIDT, a citizen of the United States of America, and a resident of Mansfield, county of Richland, State of Ohio, have invented certain new and useful Improvements in Fishing-Poles and Reels, of which the following is a specification.

The object of my invention is a fishing-pole wherein the movement of the reel is accompanied by a minimum amount of friction when running freely and which has a brake which may be readily applied to check the speed of the reel and in which the reel may be readily locked in any desired position when the length of the pole is altered.

My invention also is designed to afford a ready means for changing the length of the pole. This object is attained by the means described in the specification and illustrated in the accompanying drawings, in which—

Figure 1:
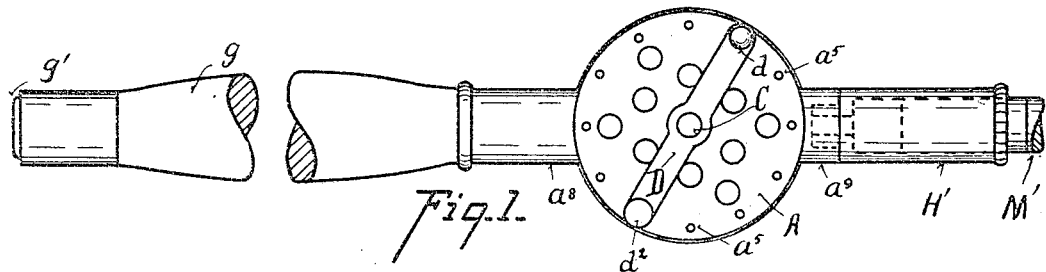
Figure 2:
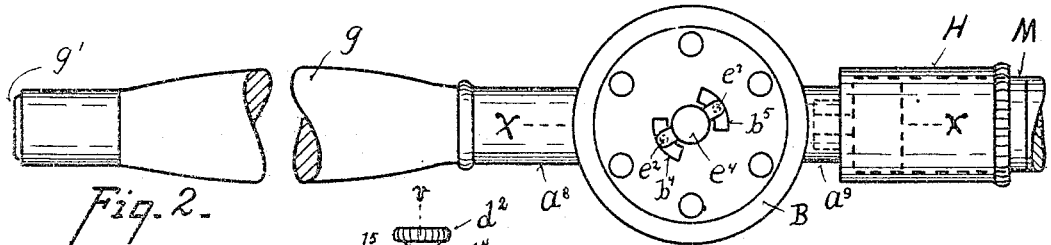
Figure 3:
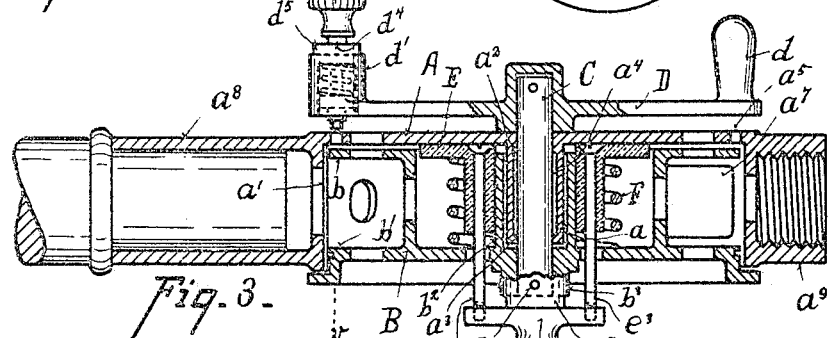
Figures 4, 6:
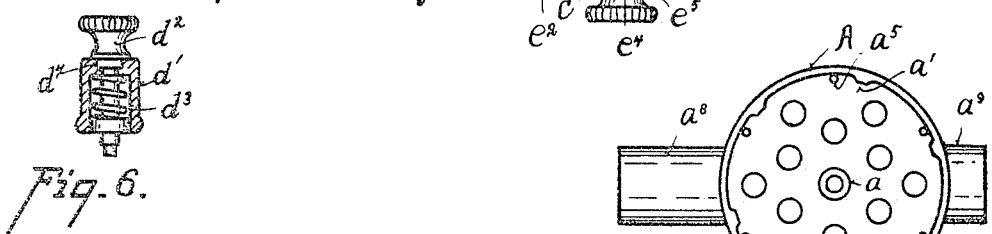
Figure 9:
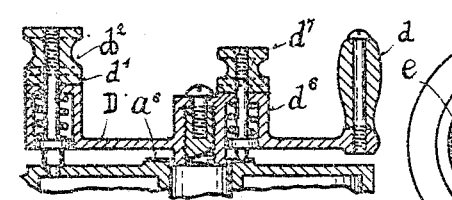
Figure 5:
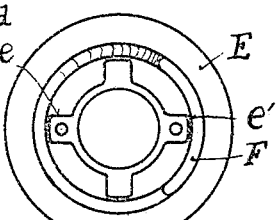

Figure 1 is a view showing part of the pole and the reel in front elevation. Fig. 2 is a similar view, but showing the reel in rear elevation. Fig. 3 is a sectional view taken upon line $x$ $x$ of Fig. 2 upon an enlarged scale. Fig. 4 is a front elevation of the reel with the crank or handle removed therefrom, showing also a slightly-modified form of reel. Fig. 5 is a plan of the interior of the friction-disk shown in Fig. 3. Fig. 6 is a detail sectional view of the locking-pin, taken upon line $r$ $r$ of Fig. 3. Fig. 7 is a detail view of a part of the brake mechanism. Fig. 8 is a detail view of a knurl upon the housing. Fig. 9 is a form of crank or handle, showing it carrying a means for braking the motion of the reel. Fig. 10 is a view similar to Fig. 3 of my preferred form of pole and reel. Fig. 11 is a detail view of part of the housing, partially in section, partially in elevation, showing the ribs upon the interior thereof. Fig. 12 is a detail perspective view of the locking-pin for the crank-arm. Fig. 13 is a similar view of the housing in which the pin is situated.

Referring to the parts, housing A of the reel consists of a circular box having an open top and a central annular flange $a$. The reel consists of a spool B, whose flanges $b$ $b'$ fit into the housing A, which has ribs $a'$ at intervals upon its interior to allow contact of flanges $b$ $b'$, so as to hold the line in place upon the spool while reducing the frictional contact between the interior of the box and the spool. Reel B has likewise a central annular flange $b^2$ upon its interior, which passes loosely over the circular flange $a$ of the housing, so as not to contact the same. Reel B has also an internal hub $b^3$, through which the axis C passes and to which the hub is secured by a pin $c$. The annular flange $a$ of the housing A has at its ends inwardly-projecting flanges $a^2$ $a^3$, which bear against the axis C, forming around it an oil-chamber $a^4$ and forming the only bearing for the rotating axis C, so that the friction thereof is reduced to a minimum. Upon the end of axis C is secured a crank or handle D, which carries at one end a knob $d$, which is to be grasped by the angler, and at its other end carries a circular housing $d'$, within which is seated a pin $d^2$, which is surrounded by a coiled spring $d^3$ upon the interior of the housing $d'$. The housing $d'$ has a diametrical slot $d^4$ in its upper face, and the pin $d^2$ carries an arm $d^5$, which may be made to register with the slot $d^4$, as shown in Fig. 6, when the pin $d^2$ is in its innermost position and which rests against the outer face of the housing when the pin is drawn inward, as shown in Fig. 3. Housing A has in its face a series of perforations $a^5$ in the path of the pin $d^2$, so that when it is desired to lock handle D in any position the pin $d^2$ is allowed to enter one of the perforations $a^5$.

The means of putting the brake upon the movement of the reel will now be described. In the form illustrated in Fig. 3 within the spool B, I have placed a central friction-disk E, which has outwardly-projecting lugs $e$ $e'$, which are centrally perforated to pass elongated screws $e^2$ $e^2$, which pass outward through curved slots $b^4$ $b^5$ in the upper face of the spool and upon their ends are secured to a bar $e^4$, which has upon one side a projection $e^5$, (shown in dotted lines in Fig. 3,) which may be made to register with the diametrical slot in the hub $b^3$, in which position the disk E bears against the housing A, as shown in Fig. 3, or may be raised so that it rests upon the outer face of the hub $b^3$, in which position the disk E is carried out of contact with the housing A. When the bar $e^5$ is made to register with the slot in the hub $b^3$, disk E is held in contact with the housing by a coiled spring F, in which position the reel would move with greater friction than when the disk E is not in contact with the housing.

A form of brake movement is illustrated in Fig. 9. In this modification the crank B has adjacent to its hub a small housing $d^6$, which carries a spring-pressed pin $d^7$ of a construction similar to the pin $d^2$, which at its lower pointed end may be made to contact a circular knurl $a^6$, formed upon the housing A. When the pin contacts this knurl, it puts a brake upon the movement of the reel. When it is desired to take the brake off, the pin $d^7$ is raised in a manner similar to the pin $d^2$.

Housing A has two openings in its circular walls $a^7$, one opening on each side of the pole, for the exit of the line from the reel, so that the pole may be used for either a right or a left handed angler. Housing A has upon its exterior at diametrically opposite points two annular flanges $a^8 a^9$. Flange $a^8$ may be made plain upon its interior to receive the end of the handle $g$ of the pole, the lower end of which is preferably made hollow to receive a cork $g'$. The other flange, $a^9$, is interiorly screw-threaded to receive the screw-threaded ends of various-sized sockets H H'. These sockets are made of different sizes, so that the length of the pole may be varied. In Fig. 2 I have illustrated one of the larger sockets to receive the first section M of a jointed fishing-rod. In Fig. 1 I have illustrated a small socket H' to receive one of the upper sections M' of the rod, so that by simply changing the sockets and removing one or more sections of the pole the rod may be made of any length desired.

What I claim is—

1. A reel consisting of a housing in the shape of a box open at one end having in its closed end a central perforation and surrounding the perforation an interior hub, an axis passing through the hub, contacting therewith only at its ends and forming therewith an oil-chamber surrounding the axis, and a spool journaled within the housing and secured to the axis, substantially as shown and described.

2. A reel consisting of a housing in the shape of a box open at one end, having in its closed end a central perforation and surrounding the perforation an interior hub with internal flanges at its ends, an axis passing through the hub and contacting the flanges thereof and a spool journaled in the housing, substantially as shown and described.

3. A reel consisting of a housing in the shape of a box open at one end, having in its closed end a central perforation and surrounding the perforation an interior hub, an axis passing through the hub contacting therewith only at its ends and forming therewith an oil-chamber surrounding the axis, a spool journaled within the housing having a central hub surrounding the hub of the housing and means for securing the spool to the axis, substantially as shown and described.

4. A reel consisting of a housing in the shape of a box open at one end having ribs at intervals upon the interior of its circular walls, an axis journaled in the housing, a spool having circular flanges to contact the ribs upon the interior of the housing and means for securing the spool to the axis, substantially as shown and described.

5. A reel consisting of a housing, a spool within the housing, an axis journaled in the housing, means for securing the spool to the axis, and a spring-pressed contacting piece carried by the axis adapted to bear against the housing to form a brake upon the wheel, substantially as shown and described.

6. In a reel the combination of a housing having upon its face a knurl, a spool within the housing, an axis rotating in the housing, means for securing the axis and the spool together, a crank-arm carried by the axis and a spring-pressed pin adapted to bear against the knurl on the housing to act as a brake to the wheel, substantially as shown and described.

7. In a reel the combination of a housing in the shape of a box open at one end and closed at the other, having in its closed end a series of perforations, a spool and an axis journaled in the housing, means for securing the axis and the spool together, a crank secured to the axis, and a pin carried by the crank and adapted to engage the perforations in the housing to lock the reel in any desired position, substantially as shown and described.

FRANK SCHREIDT.

Witnesses:
R. R. REED,
CHAS. E. SCHREIDT.